(12) United States Patent
Fujikawa et al.

(10) Patent No.: US 10,351,663 B2
(45) Date of Patent: Jul. 16, 2019

(54) CURABLE COMPOSITION AND OPTICAL ELEMENT OBTAINED USING SAME

(71) Applicant: DAICEL CORPORATION, Osaka-shi, Osaka (JP)

(72) Inventors: Takeshi Fujikawa, Himeji (JP); Takashi Kubo, Tokyo (JP)

(73) Assignee: DAICEL CORPORATION, Osaka-Shi, Osaka (JP)

(*) Notice: Subject to any disclaimer, the term of this patent is extended or adjusted under 35 U.S.C. 154(b) by 0 days.

(21) Appl. No.: 15/511,838

(22) PCT Filed: Aug. 28, 2015

(86) PCT No.: PCT/JP2015/074428
§ 371 (c)(1),
(2) Date: Mar. 16, 2017

(87) PCT Pub. No.: WO2016/043024
PCT Pub. Date: Mar. 24, 2016

(65) Prior Publication Data
US 2017/0260323 A1     Sep. 14, 2017

(30) Foreign Application Priority Data

Sep. 17, 2014   (JP) ................. 2014-188474
Mar. 18, 2015   (JP) ................. 2015-054460

(51) Int. Cl.
| | | |
|---|---|---|
| C08F 2/46 | (2006.01) | |
| C08F 2/50 | (2006.01) | |
| C08G 61/04 | (2006.01) | |
| C08G 59/68 | (2006.01) | |
| C08G 59/24 | (2006.01) | |
| C08G 59/72 | (2006.01) | |
| G02B 1/04 | (2006.01) | |

(52) U.S. Cl.
CPC ............ *C08G 59/68* (2013.01); *C08G 59/24* (2013.01); *C08G 59/72* (2013.01); *G02B 1/04* (2013.01)

(58) Field of Classification Search
CPC ........... C08G 59/68; C08G 59/24; G02B 1/04
USPC ................. 522/31, 6, 71, 189, 184, 1; 520/1
See application file for complete search history.

(56) References Cited

U.S. PATENT DOCUMENTS

| 6,054,501 | A | 4/2000 | Taniguchi et al. | |
|---|---|---|---|---|
| 8,304,470 | B2 | 11/2012 | Noro et al. | |
| 10,018,810 | B2 | 7/2018 | Kubo et al. | |
| 2007/0115326 | A1* | 5/2007 | Yokoi ................. | B41C 1/1066 347/52 |
| 2008/0107821 | A1 | 5/2008 | Sasa et al. | |
| 2009/0041945 | A1* | 2/2009 | Ookubo ............. | B41M 5/0023 427/511 |
| 2010/0324164 | A1 | 12/2010 | Higo et al. | |
| 2011/0008577 | A1* | 1/2011 | Miyake ............... | B29C 59/022 428/156 |
| 2014/0316081 | A1 | 10/2014 | Toyama et al. | |
| 2015/0212300 | A1 | 7/2015 | Kubo et al. | |
| 2018/0284396 | A1 | 10/2018 | Kubo et al. | |

FOREIGN PATENT DOCUMENTS

| EP | 3196679 A1 | 7/2017 |
|---|---|---|
| JP | 10-1507 A | 1/1998 |
| JP | 10-7680 A | 1/1998 |
| JP | 2009-286928 A | 6/2002 |
| JP | 2005-320435 A | 11/2005 |
| JP | 2006-316213 A | 11/2006 |
| JP | 3991667 B2 | 10/2007 |
| JP | 2011-132487 A | 7/2011 |
| JP | 2011 201803 A | 10/2011 |
| JP | 5070131 B2 | 11/2012 |
| JP | 2014-125507 A | 7/2014 |
| JP | 2014-214129 | * 11/2014 |
| JP | 2014-214129 A | 11/2014 |
| TW | 201412807 A | 4/2014 |
| WO | WO 02/46263 A1 | 6/2002 |
| WO | WO 2006/100978 A1 | 9/2006 |
| WO | WO2013/084708 A1 | 6/2013 |

OTHER PUBLICATIONS

Kimura et al, JP 2014-214129 Machine Translation Part 1, Nov. 17, 2014 (Year: 2014).*
Kimura et al, JP 2014-214129 Machine Translation Part 2, Nov. 17, 2014 (Year: 2014).*
International Search Report for PCT/JP2015/074428 dated Nov. 2, 2015.
Written Opinion of the International Searching Authority for PCT/JP2015/074428 (PCT/ISA/237) dated Nov. 2, 2015.

* cited by examiner

*Primary Examiner* — Jessica Whiteley
(74) *Attorney, Agent, or Firm* — Birch, Stewart, Kolasch & Birch, LLP

(57) ABSTRACT

Provided is a curable composition which has excellent thin-film curability and which can form, via the application of light and/or heat, a cured product having heat resistance and thermal yellowing resistance at excellent levels. This curable composition contains cationically curable compounds and a cationic-polymerization initiator. The cationically curable compounds include an epoxy compound (A) in an amount of 10 to 90 weight percent of the total weight of the cationically curable compounds, and an oxetane compound (B) in an amount of 5 to 40 weight percent of the total weight of the cationically curable compounds. The cationic-polymerization initiator includes an onium borate salt (C). The onium borate salt (C) preferably has an anionic moiety selected from $[(C_6H_5)B(C_6F_5)_3]^-$, $[(C_6H_5)B((CF_3CF_2)_2C_6H_2F)_3]^-$, and $[(C_6H_5C_6H_4)B(C_6F_5)_3]^-$ and a cationic moiety selected from arylsulfonium ions.

13 Claims, No Drawings

CURABLE COMPOSITION AND OPTICAL ELEMENT OBTAINED USING SAME

TECHNICAL FIELD

The present invention relates to a curable composition which forms a cured product having curability, heat resistance, and thermal yellowing resistance at excellent levels, and to an optical element produced using the cured composition. This application claims priority to: Japanese Patent Application No. 2014-188474, filed Sep. 17, 2014 to Japan; and Japanese Patent Application No. 2015-054460, filed Mar. 18, 2015, the entire contents of each of which applications are incorporated herein by reference.

BACKGROUND ART

Portable electronic devices such as cellular phones and smartphones recently have grown in demand. Electronic devices as above are equipped with small, slim imaging units.

The imaging units each generally include a solid-state imager, and optical elements such as lenses. The solid-state imager is exemplified by CCD image sensors and CMOS image sensors.

For more efficient production, optical elements to be on the electronic devices require such heat resistance and thermal yellowing resistance as to allow the optical elements to be mounted on the devices by reflow soldering. In addition, the optical elements require still higher levels of heat resistance (about 270° C.) and thermal yellowing resistance, because the use of lead has recently been restricted with consideration for the environment, and soldering using lead-free solder becomes practical.

The optical elements such as lenses are preferably derived from cationically curable compositions as materials. This is because the cationically curable compositions resist cure inhibition by oxygen and less shrink upon curing, as compared with radically curable compositions.

The cationically curable compositions each include a cationically curable compound and a cationic-polymerization initiator. Known examples of the cationic-polymerization initiator include antimony, phosphorus, and borate initiators (Patent Literature (PTL) 1 to 4). Among them, antimony initiators have been widely used. This is because the antimony initiators have excellent cationic polymerization activities and can form cured products even as thin films having a thickness of 50 µm or less (namely, offer excellent curability to form a thin film (thin-film curability). In addition, the resulting cure products can maintain their shapes (namely, have excellent heat resistance) and resist yellowing (namely, have excellent thermal yellowing resistance) even under high-temperature conditions such as reflow soldering conditions.

Disadvantageously, however, the antimony initiators are designated as deleterious substances and have safety problems.

Known phosphorus initiators include onium salts containing a $PF_6^-$ anion. These initiators offer excellent thin-film curability, but disadvantageously give cured products that are susceptible to yellowing under high-temperature conditions. The special phosphorus initiators disadvantageously offer inferior thin-film curability.

Known borate initiators include onium salts containing a $B(C_6F_5)_4^-$ or $BF_4^-$ anion. Among them, the onium salts containing a $BF_4^-$ anion disadvantageously have low cationic polymerization activities and offer inferior thin-film curability. In contrast, the onium salts containing a $B(C_6F_5)_4^-$ anion offer excellent thin-film curability, but disadvantageously give cured products that are susceptible to yellowing under high-temperature conditions.

CITATION LIST

Patent Literature

PTL 1: Japanese Unexamined Patent Application Publication (JP-A) No. 2011-201803
PTL 2: JP-A No. 2014-125507
PTL 3: Japanese Patent No. 3991667
PTL 4: Japanese Patent No. 5070131

SUMMARY OF INVENTION

Technical Problem

Accordingly, the present invention has an object to provide a curable composition as follows. The curable composition has excellent thin-film curability and, via the application of light and/or heat, can form a cured product that has excellent resistance to heat and to thermal yellowing (namely, that can maintain its shape and resists yellowing even under high-temperature conditions such as reflow soldering conditions).

The present invention has another object to provide a cured product which is derived from the curable composition and which has curability, heat resistance, and thermal yellowing resistance all at satisfactory levels.

The present invention has still another object to provide an optical element including the cured product, and to provide an optical device including the optical element.

Solution to Problem

After intensive investigations to achieve the objects, the inventors of the present invention found a curable composition including a cycloaliphatic epoxy compound (epoxide), an oxetane compound (oxetane), and a specific borate cationic-polymerization initiator and found that this curable composition has excellent thin-film curability and, via the application of light and/or heat, can form a cured product that has excellent curability and excellent transparency and has such properties as to resist deformation and yellowing even under high-temperature conditions such as reflow soldering conditions (namely, has heat resistance and thermal yellowing resistance). The present invention has been made on the basis of these findings.

Specifically, the present invention provides, in an embodiment, a curable composition containing cationically curable compounds and a cationic-polymerization initiator.

The cationically curable compounds include (A) an epoxy compound in an amount of 10 to 90 weight percent of the total weight of the cationically curable compounds, and (B) an oxetane compound in an amount of 5 to 40 weight percent of the total weight of the cationically curable compounds. The epoxy compound (A) includes a compound represented by Formula (a). The cationic-polymerization initiator includes (C) an onium borate salt containing an anionic moiety represented by Formula (c-1) and a cationic moiety represented by formula (c-2). Formulae (a), (c-1), and (c-2) are expressed as follows:

[Chem. 1]

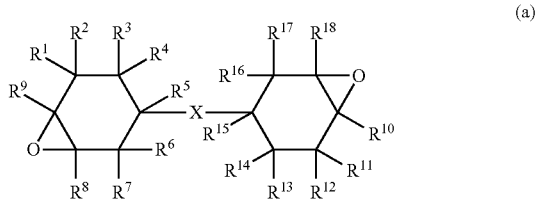
(a)

where $R^1$ to $R^{18}$ are each, identically or differently, selected from hydrogen, halogen, a hydrocarbon group optionally containing oxygen or halogen, and optionally substituted alkoxy; and X is selected from a single bond and a linkage group,

(c-1)

where Y is, independently in each occurrence, selected from $C_6$-$C_{30}$ aryl and a $C_4$-$C_{30}$ heterocyclic group, each of which may have one or more substituents (excluding halogen-containing groups); Phf represents a group resulting from replacing at least one hydrogen atom of phenyl with at least one selected from perfluoroalkyl, perfluoroalkoxy, and halogen; and k is an integer of 1 to 3,

[Chem. 2]

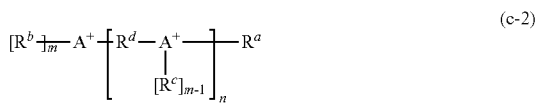
(c-2)

where "A" represents a m-valent atom selected from sulfur (S), iodine (I), and selenium (Se) atoms; $R^a$, $R^b$, and $R^c$ are monovalent groups and are each, identically or differently in each occurrence, selected from a $C_1$-$C_{30}$ hydrocarbon group, a $C_4$-$C_{30}$ heterocyclic group, and a group including two or more of these groups bonded to each other through a single bond or a linkage group, each of which groups may have one or more substituents; $R^d$ is a divalent group and is selected from a $C_1$-$C_{30}$ hydrocarbon group, a $C_4$-$C_{30}$ heterocyclic group, and a group including two or more of these groups bonded to each other through a single bond or a linkage group, each of which groups may have one or more substituents, where the linkage group is, independently in each occurrence, selected from —O—, —S—, —SO—, —SO$_2$—, —NH—, —NR'— (where R' is selected from $C_1$-$C_5$ alkyl and $C_6$-$C_{10}$ aryl), —CO—, —COO—, —CONH—, and $C_1$-$C_3$ alkylene; and n is selected from 0 and 1.

In the curable composition, the anionic moiety of the onium borate salt (C) may be selected from $[(C_6H_5)B(C_6F_5)_3]^-$, $[(C_6H_5)B((CF_3CF_2)_2C_6H_2F)_3]^-$, and $[(C_6H_5C_6H_4)B(C_6F_5)_3]^-$.

In the curable composition, the cationic moiety of the onium borate salt (C) may be selected from arylsulfonium ions.

In the curable composition, the epoxy compound (A) may further include a glycidyl ether epoxy compound.

The curable composition may further contain an antioxidant (D).

The present invention provides, in another embodiment, a cured product of the curable composition.

The present invention also provides, in yet another embodiment, a cured product derived from the curable composition via irradiation with light from a UV-LED (wavelength: 350 to 450 nm)

The cured products may each have a thickness of 50 μm or less.

The present invention provides, in another embodiment, an optical element including any of the cured products.

In addition and advantageously, the present invention provides an optical device including the optical element.

Specifically, the present invention relates to followings.

(1) A curable composition comprising: cationically curable compounds; and a cationic-polymerization initiator, the cationically curable compounds comprising: (A) an epoxy compound in an amount of 10 to 90 weight percent of the total weight of the cationically curable compounds, the epoxy compound (A) comprising a compound represented by Formula (a); and (B) an oxetane compound in an amount of 5 to 40 weight percent of the total weight of the cationically curable compounds, the cationic-polymerization initiator comprising (C) an onium borate salt comprising an anionic moiety represented by Formula (c-1) and a cationic moiety represented by Formula (c-2), formula (c-1) is expressed as follows:

(c-1)

where Y is, independently in each occurrence, selected from $C_6$-$C_{30}$ aryl and a $C_4$-$C_{30}$ heterocyclic group, each of which may have one or more substituents (excluding halogen-containing groups); Phf represents a group resulting from replacing at least one hydrogen atom of phenyl with at least one selected from perfluoroalkyl, perfluoroalkoxy, and halogen; and k is an integer of 1 to 3.

(2) The curable composition according to (1), wherein the anionic moiety of the onium borate salt (C) is selected from the group consisting of $[(C_6H_5)B(C_6F_5)_3]^-$, $[(C_6H_5)B((CF_3CF_2)_2C_6H_2F)_3]^-$, and $[(C_6H_5C_6H_4)B(C_6F_5)_3]^-$.

(3) The curable composition according to one of (1) and (2), wherein the cationic moiety of the onium borate salt (C) is selected from arylsulfonium ions.

(4) The curable composition according to (1), wherein the onium borate salt (C) is at least one compound selected from the group consisting of 4-(phenylthio)phenyldiphenylsulfonium phenyltris(pentafluorophenyl)borate, bis[4-(diphenylsulfonio)phenyl]sulfide phenyltris(pentafluorophenyl)borate, [4-(4-biphenylylthio)phenyl]-4-biphenylylphenylsulfonium phenyltris(pentafluorophenyl)borate, and [4-(2-thioxanthonylthio)phenyl]phenyl-2-thioxanthonylsulfonium phenyltris(pentafluorophenyl)borate.

(5) The curable composition according to (1), wherein the onium borate salt (C) is at least one compound selected from the group consisting of 4-hydroxyphenyl-methyl-benzylsulfonium phenyltris(pentafluorophenyl)borate, 4-hydroxyphenyl-methyl-(2-methylbenzyl)sulfonium phenyltris(pentafluorophenyl)borate, 4-hydroxyphenyl-methyl-1-naphthylmethylsulfonium phenyltris(pentafluorophenyl)borate, and p-methoxycarbonyloxyphenyl-benzylmethylsulfonium phenyltris(pentafluorophenyl)borate.

(6) The curable composition according to any one of (1) to (5), wherein the curable composition contains the onium borate salt (C) in a proportion of 0.1 to 10.0 parts by weight per 100 parts by weight of the cationically curable compounds.

(7) The curable composition according to any one of (1) to (6), wherein the compound represented by Formula (a) is at least one compound selected from the group consisting of 3,4-epoxycyclohexylmethyl (3,4-epoxy)cyclohexanecarboxylate, (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohex-1-yl)propane, and 1,2-bis(3,4-epoxycyclohex-1-yl)ethane.

(8) The curable composition according to any one of (1) to (7), wherein the curable composition contains the compound represented by Formula (a) in a content of 10 to 90 weight percent of the total weight of the cationically curable compounds.

(9) The curable composition according to any one of (1) to (8), wherein the epoxy compound (A) further include a glycidyl ether epoxy compound.

(10) The curable composition according to any one of (1) to (9), wherein the oxetane compound (B) is a compound represented by Formula (b).

(11) The curable composition according to any one of (1) to (10), wherein the oxetane compound (B) is at least one compound selected from compounds represented by Formulae (b-1) to (b-15).

(12) The curable composition according to any one of (1) to (11), wherein the curable composition contains the epoxy compound (A) and the oxetane compound (B) in a total content of 70 weight percent or more (preferably 80 weight percent or more, particularly preferably 90 weight percent or more, and most preferably 95 weight percent or more) of the total weight of the cationically curable compounds.

(13) The curable composition according to any one of (1) to (12), further containing an antioxidant (D).

(14) The curable composition according to (13), wherein the antioxidant (D) is at least one compound selected from the group consisting of pentaerythritol tetrakis[3-(3,5-di-t-butyl-4-hydroxyphenyl)propionate], thiodiethylene bis[3-(3,5-di-t-butyl-4-hydroxyphenyl)propionate], octadecyl 3-(3,5-di-t-butyl-4-hydroxyphenyl)propanoate, N,N'-hexamethylenebis[3-(3,5-di-t-butyl-4-hydroxyphenyl)propionamide], octyl 3-(4-hydroxy-3,5-diisopropylphenyl)propionate, 1,3,5-tris(4-hydroxy-3,5-di-t-butylbenzyl)-2,4,6-trimethylbenzene, 2,4-bis(dodecylthiomethyl)-6-methylphenol, and calcium bis[3,5-di(t-butyl)-4-hydroxybenzyl(ethoxy)phosphinate].

(15) The curable composition according to one of (13) and (14), wherein the curable composition contains the antioxidant (D) in a proportion of 0.05 to 5.0 parts by weight per 100 parts by weight of the cationically curable compounds.

(16) The curable composition according to any one of (1) to (15), having a viscosity of 50 to 3000 mPa·s at 25° C. and a shear rate of 20 s$^{-1}$.

(17) A cured product of the curable composition according to any one of (1) to (16).

(18) A cured product derived from the curable composition according to any one of (1) to (16) via irradiation with light from a UV-LED (wavelength: 350 to 450 nm).

(19) The cured product according to one of (17) and (18), having a 5% weight loss temperature of 260° C. or higher.

(20) The cured product according to any one of (17) to (19), having a yellowness index (YI) of 1.0 or less.

(21) The cured product according to any one of (17) to (20), having a yellowness index (YI) of 2.0 or less, after being subjected to heat tests (successive three heat tests each according to the reflow temperature profile (at a highest temperature of 270° C.) described in the JEDEC Standards).

(22) The cured product according to any one of (17) to (21), having a thickness of 50 μm or less.

(23) An optical element including the cured product according to any one of (17) to (22).

(24) The optical element according to (23), which is selected from the group consisting of lenses, prisms, LEDs, organic electroluminescence elements, semiconductor laser elements, transistors, solar cells, CCD image sensors, optical waveguides, optical fibers, display substrates, hard disk drive substrates, and polarizing films.

(25) An optical device including the optical element according to one of (23) and (24).

(26) The optical device according to (25), which is selected from the group consisting of portable electronic devices and on-vehicle electronic devices.

(27) A method for producing a cured product. The method includes irradiating the curable composition according to any one of (1) to (16) with light from a UV-LED (wavelength: 350 to 450 nm) to yield the cured product.

Advantageous Effects of Invention

The curable composition according to the present invention has the configuration, thereby offers excellent thin-film curability, and, via the application of light and/or heat, can form a cured product that has curability, transparency, heat resistance, and thermal yellowing resistance at excellent levels. Thus, the curable composition according to the present invention is advantageously usable typically as or for optical element materials such as lens or prism materials, encapsulants (sealants), optical waveguide-forming materials, adhesives, optical fiber-forming materials, imprinting materials, and alternative glass-forming materials; resists; and coating agents. For example, the curable composition according to the present invention, when used as an optical element material, gives an optical element that has excellent transparency, resists yellowing even when subjected to a reflow soldering process, and can maintain optical properties at high levels. This eliminates or minimizes the need for mounting the optical element by another extra process or step, but allows the optical element to be mounted together with other components collectively by reflow soldering, and gives an optical device including the optical element with excellent working efficiency. In addition, the curable composition is also usable for on-vehicle electronic devices, which require heat resistance.

DESCRIPTION OF EMBODIMENTS

Epoxy Compound (A)

The curable composition according to the present invention contains an epoxy compound, which is a cationically curable compound and which includes a compound (cycloaliphatic epoxy compound) represented by Formula (a):

[Chem. 3]

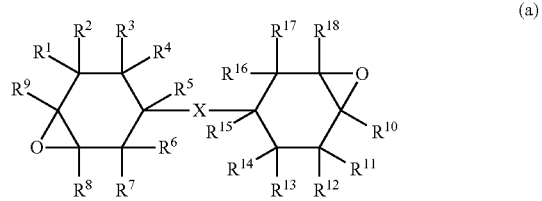

(a)

In Formula (a), $R^1$ to $R^{18}$ are each, identically or differently, selected from hydrogen, halogen, a hydrocarbon group optionally containing oxygen or halogen, and optionally substituted alkoxy; and X is selected from a single bond and a linkage group.

Non-limiting examples of the halogen as $R^1$ to $R^{18}$ include fluorine, chlorine, bromine, and iodine.

Examples of the hydrocarbon group in $R^1$ to $R^{18}$ include aliphatic hydrocarbon groups, alicyclic hydrocarbon groups, aromatic hydrocarbon groups, and groups each including two or more of these groups bonded to each other.

Non-limiting examples of the aliphatic hydrocarbon groups include alkyls containing 1 to 20 carbon atoms (i.e., $C_1$-$C_{20}$ alkyls) such as methyl, ethyl, propyl, isopropyl, butyl, hexyl, octyl, isooctyl, decyl, and dodecyl, of which $C_1$-$C_{10}$ alkyls are preferred, and $C_1$-$C_4$ alkyls are particularly preferred; $C_2$-$C_{20}$ alkenyls such as vinyl, allyl, methallyl, 1-propenyl, isopropenyl, 1-butenyl, 2-butenyl, 3-butenyl, 1-pentenyl, 2-pentenyl, 3-pentenyl, 4-pentenyl, and 5-hexenyl, of which $C_2$-$C_{10}$ alkenyls are preferred, and $C_2$-$C_4$ alkenyls are particularly preferred; and $C_2$-$C_{20}$ alkynyls such as ethynyl and propynyl, of which $C_2$-$C_{10}$ alkynyls are preferred, and $C_2$-$C_4$ alkynyls are particularly preferred.

Non-limiting examples of the alicyclic hydrocarbon groups include $C_3$-$C_{12}$ cycloalkyls such as cyclopropyl, cyclobutyl, cyclopentyl, cyclohexyl, and cyclododecyl; $C_3$-$C_{12}$ cycloalkenyls such as cyclohexenyl; and $C_4$-$C_{15}$ bridged hydrocarbon groups such as bicycloheptyl and bicycloheptenyl.

Non-limiting examples of the aromatic hydrocarbon groups include $C_6$-$C_{14}$ aryls such as phenyl and naphthyl, of which $C_6$-$C_{10}$ aryls are preferred.

Non-limiting examples of the hydrocarbon group optionally containing oxygen or halogen, as $R^1$ to $R^{18}$, include groups resulting from replacing at least one hydrogen atom each in the above-mentioned hydrocarbon groups with an oxygen-containing group or a halogen-containing group. Non-limiting examples of the oxygen-containing group include hydroxy; hydroperoxy; $C_1$-$C_{10}$ alkoxys such as methoxy, ethoxy, propoxy, isopropyloxy, butoxy, and isobutyloxy; $C_2$-$C_{10}$ alkenyloxys such as allyloxy; tolyloxy, naphthyloxy, and other $C_6$-$C_{14}$ aryloxys which may have one or more substituents selected from $C_1$-$C_{10}$ alkyls, $C_2$-$C_{10}$ alkenyls, halogens, and $C_1$-$C_{10}$ alkoxys; $C_7$-$C_{18}$ aralkyloxys such as benzyloxy and phenethyloxy; $C_1$-$C_{10}$ acyloxys such as acetyloxy, propionyloxy, (meth)acryloyloxy, and benzoyloxy; $C_1$-$C_{10}$ alkoxy-carbonyls such as methoxycarbonyl, ethoxycarbonyl, propoxycarbonyl, and butoxycarbonyl; phenoxycarbonyl, tolyloxycarbonyl, naphthyloxycarbonyl, and other $C_6$-$C_{14}$ aryloxy-carbonyls which may have one or more substituents selected from $C_1$-$C_{10}$ alkyls, $C_2$-$C_{10}$ alkenyls, halogens, and $C_1$-$C_{10}$ alkoxys; $C_7$-$C_8$ aralkyloxy-carbonyls such as benzyloxycarbonyl; epoxy-containing groups such as glycidyloxy; oxetanyl-containing groups such as ethyloxetanyloxy; $C_1$-$C_{10}$ acyls such as acetyl, propionyl, and benzoyl; isocyanato; sulfo; carbamoyl; oxo; and groups each including two or more of these bonded to each other through a single bond or a linkage group such as $C_1$-$C_{10}$ alkylene. Non-limiting examples of the halogen-containing group include fluorine, chlorine, bromine, and iodine atoms.

Non-limiting examples of the alkoxy in $R^1$ to $R^{18}$ include $C_1$-$C_{10}$ alkoxys such as methoxy, ethoxy, propoxy, isopropyloxy, butoxy, and isobutyloxy.

Non-limiting examples of the substituents which the alkoxy may have include halogens, hydroxy, $C_1$-$C_{10}$ alkoxys, $C_2$-$C_{10}$ alkenyloxys, $C_6$-$C_{14}$ aryloxys, $C_1$-$C_{10}$ acyloxys, mercapto, $C_1$-$C_{10}$ alkylthios, $C_2$-$C_{10}$ alkenylthios, $C_6$-$C_{14}$ arylthios, $C_7$-$C_{18}$ aralkylthios, carboxy, $C_1$-$C_{10}$ alkoxy-carbonyls, $C_6$-$C_{14}$ aryloxy-carbonyls, $C_7$-$C_{18}$ aralkyloxy-carbonyls, amino, mono- or di-($C_1$-$C_{10}$ alkyl)aminos, $C_1$-$C_{10}$ acylaminos, epoxy-containing groups, oxetanyl-containing groups, $C_1$-$C_{10}$ acyls, oxo, and groups each including two or more of these groups bonded to each other through a single bond or a linkage group such as $C_1$-$C_{10}$ alkylene.

Among them, $R^1$ to $R^{18}$ are preferably hydrogen atoms.

X in Formula (a) is selected from a single bond and a linkage group, where the term "linkage group" refers to a divalent group containing one or more atoms. Non-limiting examples of the linkage group include divalent hydrocarbon groups, alkenylene groups except with part or all of carbon-carbon double bond(s) being epoxidized, carbonyl, ether bond, ester bond, amido, and groups each including two or more of these linked to each other.

Non-limiting examples of the divalent hydrocarbon groups include linear or branched $C_1$-$C_{18}$ alkylenes such as methylene, methylmethylene, dimethylmethylene, ethylene, propylene, and trimethylene, of which linear or branched $C_1$-$C_3$ alkylenes are preferred; $C_3$-$C_{12}$ cycloalkylenes and $C_3$-$C_{12}$ cycloalkylidenes, such as 1,2-cyclopentylene, 1,3-cyclopentylene, cyclopentylidene, 1,2-cyclohexylene, 1,3-cyclohexylene, 1,4-cyclohexylene, and cyclohexylidene, of which $C_3$-$C_6$ cycloalkylenes and $C_3$-$C_6$ cycloalkylidenes are preferred.

The alkylene groups except with part or all of carbon-carbon double bond(s) being epoxidized are hereinafter also referred to as "epoxidized alkenylenes". Non-limiting examples of the alkenylenes for the epoxidized alkenylenes include $C_2$-$C_8$ linear or branched alkenylenes such as vinylene, propenylene, 1-butenylene, 2-butenylene, butadienylene, pentenylene, hexenylene, heptenylene, and octenylene. In particular, the epoxidized alkenylenes are preferably selected from alkenylene groups except with all of carbon-carbon double bond(s) being epoxidized, and more preferably selected from $C_2$-$C_4$ alkenylene groups except with all of carbon-carbon double bond(s) being epoxidized.

Representative, but non-limiting examples of the compound represented by Formula (a) include 3,4-epoxycyclohexylmethyl (3,4-epoxy)cyclohexanecarboxylate, (3,4,3',4'-diepoxy)bicyclohexyl, bis(3,4-epoxycyclohexylmethyl) ether, 1,2-epoxy-1,2-bis(3,4-epoxycyclohex-1-yl)ethane, 2,2-bis(3,4-epoxycyclohex-1-yl)propane, and 1,2-bis(3,4-epoxycyclohex-1-yl)ethane. The curable composition may contain each of these compounds alone or in combination.

The compound represented by Formula (a) may be produced typically by reacting a compound represented by Formula (a') with a peroxy acid (such as peracetic acid) to epoxidize the specified double bond moieties in Formula (a'). In Formula (a'), $R^1$ to $R^{18}$ and X are as defined above.

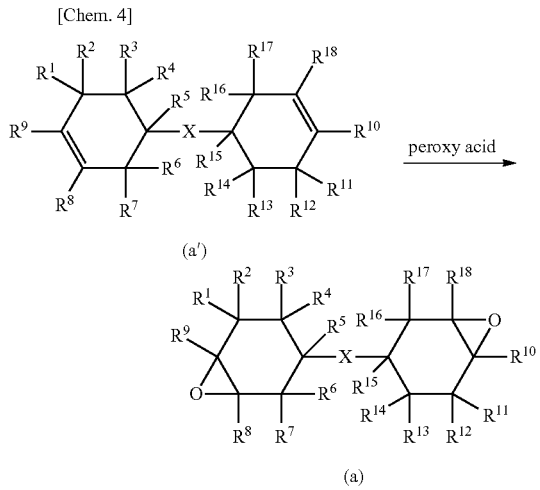

The epoxy compound (A) may further include one or more other epoxy compounds, in addition to the compound(s) represented by Formula (a). Non-limiting examples of the other epoxy compounds include glycidyl ether epoxy compounds; glycidyl ester epoxy compounds; glycidylamine epoxy compounds; cycloaliphatic epoxy compounds excluding the compounds represented by Formula (a); and epoxy-modified siloxane compounds. Non-limiting examples of the glycidyl ether epoxy compounds include aromatic glycidyl ether epoxy compounds such as bisphenol-A diglycidyl ether and bisphenol-F diglycidyl ether; cycloaliphatic glycidyl ether epoxy compounds such as hydrogenated bisphenol-A diglycidyl ether and hydrogenated bisphenol-F diglycidyl ether; and aliphatic glycidyl ether epoxy compounds. Non-limiting examples of the cycloaliphatic epoxy compounds excluding the compounds represented by Formula (a) include compounds containing one cycloaliphatic epoxy group per molecule, such as 1,2-epoxy-4-vinylcyclohexane and 1,2:8,9-diepoxylimonene; and compounds containing three or more cycloaliphatic epoxy groups per molecule. The epoxy compound (A) may include each of these compounds alone or in combination. As used herein, the term "cycloaliphatic epoxy compound" refers to a compound containing one or more cycloaliphatic epoxy groups, where the term "cycloaliphatic epoxy group" refers to an epoxy group containing an oxygen atom bonded in a triangular arrangement to two adjacent carbon atoms constituting an alicycle, and is exemplified typically by a cyclohexene oxide group.

In particular, the epoxy compound (A) for use in the present invention preferably includes a glycidyl ether epoxy compound, because this configuration enables easy rheology control so as to adjust the viscosity of the curable composition according to the intended use.

The curable composition contains the epoxy compound (A) in a content of 10 to 90 weight percent, preferably 20 to 90 weight percent, more preferably 20 to 85 weight percent, particularly preferably 30 to 80 weight percent, and most preferably 50 to 80 weight percent, of the total weight (100 weight percent) of the cationically curable compounds contained in the curable composition. When the curable composition contains two or more different compounds of this category, the term "content" refers to the total content of them. The curable composition, if containing the epoxy compound (A) in a content less than the range, tends to give a cured product that has lower mechanical properties. In contrast, the curable composition, if containing the epoxy compound (A) in a content greater than the range, tends to offer lower curability.

The curable composition may contain the compound represented by Formula (a) in a content of typically 10 weight percent or more, preferably 10 to 90 weight percent, particularly preferably 20 to 80 weight percent, and most preferably 30% to 80%, of the total weight (100 weight percent) of the cationically curable compounds contained in the curable composition. When the curable composition contains two or more different compounds of this category, the term "content" refers to the total content of them. The curable composition, if containing the compound represented by Formula (a) in a content less than the range, tends to offer lower curability.

Oxetane Compound (B)

The curable composition according to the present invention contains an oxetane compound, which is a cationically curable compound.

The oxetane compound is represented typically by Formula (b):

[Chem. 5]

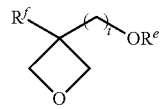

(b)

where $R^e$ represents a monovalent organic group; $R^f$ is selected from hydrogen and ethyl; and t represents an integer of 0 or more.

Examples of the monovalent organic group as $R^e$ include monovalent hydrocarbon groups, monovalent heterocyclic groups, substituted oxycarbonyls (such as alkoxycarbonyls, aryloxycarbonyls, aralkyloxycarbonyls, and cycloalkyloxycarbonyls), substituted carbamoyls (such as N-alkylcarbamoyls and N-arylcarbamoyls), acyls (exemplified by aliphatic acyls such as acetyl; and aromatic acyls such as benzoyl), and monovalent groups each including two or more of these groups bonded to each other through a single bond or a linkage group.

Non-limiting examples of the monovalent hydrocarbon groups are as with the examples for $R^1$ to $R^{18}$ in Formula (a).

The monovalent hydrocarbon groups may each have one or more of various substituents. Non-limiting examples of the substituents include halogens, oxo, hydroxy, substituted oxys (such as alkoxys, aryloxys, aralkyloxys, and acyloxys), carboxy, substituted oxycarbonyls (such as alkoxycarbonyls, aryloxycarbonyls, and aralkyloxycarbonyls), substituted or unsubstituted carbamoyls, cyano, nitro, substituted or unsubstituted aminos, sulfo, and heterocyclic groups. The hydroxy and carboxy may each be protected with a protecting group common in the field of organic synthesis.

Heterocyclic rings constituting the heterocyclic groups include aromatic heterocyclic rings and non-aromatic heterocyclic rings and are exemplified by, but not limited to, oxygen-containing heterocyclic rings, sulfur-containing heterocyclic rings, and nitrogen-containing heterocyclic rings, where oxygen, sulfur, and nitrogen are heteroatoms. Non-limiting examples of the oxygen-containing heterocyclic rings include 4-membered rings such as oxetane ring; 5-membered rings such as furan, tetrahydrofuran, oxazole, isoxazole, and y-butyrolactone rings; 6-membered rings such as 4-oxo-4H-pyran, tetrahydropyran, and morpholine rings; fused rings such as benzofuran, isobenzofuran, 4-oxo-4H-chromene, chroman, and isochroman rings; and bridged rings such as 3-oxatricyclo[4.3.1.1$^{4,8}$]undecan-2-one and 3-oxatricyclo[4.2.1.0$^{4,8}$]nonan-2-one rings. Non-limiting examples of the sulfur-containing heterocyclic rings include 5-membered rings such as thiophene, thiazole, isothiazole, and thiadiazole rings; 6-membered rings such as 4-oxo-4H-thiopyran ring; and fused rings such as benzothiophene ring. Non-limiting examples of the nitrogen-containing heterocyclic rings include 5-membered rings such as pyrrole, pyrrolidine, pyrazole, imidazole, and triazole rings; 6-membered rings such as pyridine, pyridazine, pyrimidine, pyrazine, piperidine, and piperazine rings; and fused rings such as indole, indoline, quinoline, acridine, naphthyridine, quinazoline, and purine rings. Non-limiting examples of the monovalent heterocyclic groups include groups resulting from removing one hydrogen atom each from the structural formulae of the heterocyclic rings.

The heterocyclic groups may each have one or more substituents. Non-limiting examples of the substituents include the substituents which the hydrocarbon groups may have; as well as alkyls (exemplified by $C_1$-$C_4$ alkyls such as methyl and ethyl), $C_3$-$C_{12}$ cycloalkyls, and $C_6$-$C_{14}$ aryls (such as phenyl and naphthyl).

Non-limiting examples of the linkage group include carbonyl (—CO—), ether bond (—O—), thioether bond (—S—), ester bond (—COO—), amido bond (—CONH—), carbonate bond (—OCOO—), silyl bond (—Si—), and groups each including two or more of them linked to each other.

The number t represents an integer of 0 or more and is typically 0 to 12, and preferably 1 to 6.

Non-limiting examples of the compound represented by Formula (b) include 3-methoxyoxetane, 3-ethoxyoxetane, 3-propoxyoxetane, 3-isopropoxyoxetane, 3-(n-butoxy)oxetane, 3-isobutoxyoxetane, 3-(s-butoxy)oxetane, 3-(t-butoxy)oxetane, 3-pentyloxyoxetane, 3-hexyloxyoxetane, 3-heptyloxyoxetane, 3-octyloxyoxetane, 3-(1-propenyloxy)oxetane, 3-cyclohexyloxyoxetane, 3-(4-methylcyclohexyloxy)oxetane, 3-[(2-perfluorobutyl)ethoxy]oxetane, 3-phenoxyoxetane, 3-(4-methylphenoxy)oxetane, 3-(3-chloro-1-propoxy)oxetane, 3-(3-bromo-1-propoxy)oxetane, 3-(4-fluorophenoxy)oxetane, and compounds represented by Formulae (b-1) to (b-15):

[Chem. 6]

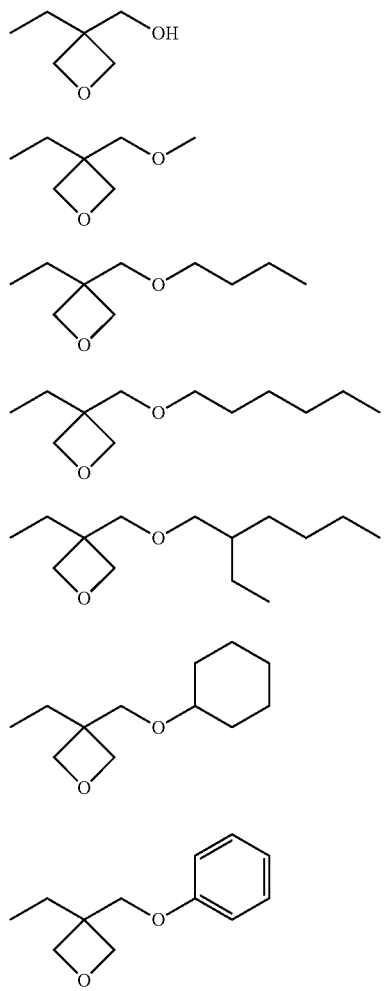
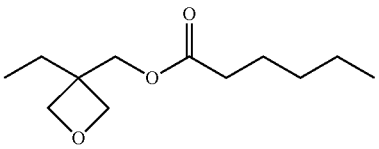
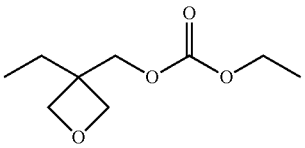
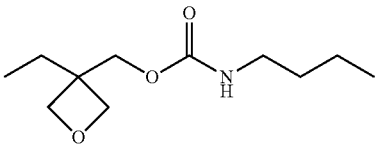
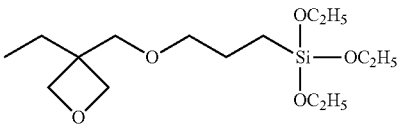
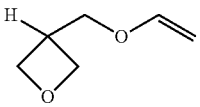
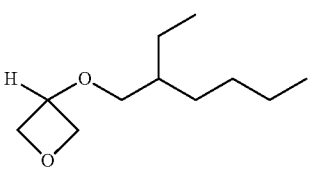
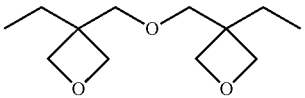
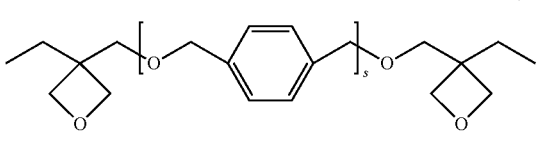

s = 1~3

Such oxetane compounds may be available as commercial products such as ARON OXETANE OXT-101, ARON OXETANE OXT-121, ARON OXETANE OXT-212, ARON OXETANE OXT-211, ARON OXETANE OXT-213, ARON OXETANE OXT-221, and ARON OXETANE OXT-610 (each from Toagosei Co., Ltd.).

The curable composition contains the oxetane compound in a content of 5 to 40 weight percent, preferably 10 to 40 weight percent, and particularly preferably 10 to 30 weight percent, of the total weight (100 weight percent) of the cationically curable compounds contained in the curable composition. When the curable composition contains two or more different compounds of this category, the term "content" refers to the total content of them. The curable composition according to the present invention, as containing the oxetane compound in a content within the range, has excellent curability. The curable composition, if containing the oxetane compound in a content less than the range, tends to offer lower curability. In contrast, the curable composition, if containing the oxetane compound in a content greater than the range, tends to give a cured product having lower mechanical properties.

Other Cationically Curable Compounds

The curable composition according to the present invention may further contain one or more other cationically curable compounds (such as vinyl ether compounds), in addition to the epoxy compound(s) and the oxetane compound(s). However, the curable composition may contain such other cationically curable compounds in a content of typically 30 weight percent or less, preferably 20 weight percent or less, particularly preferably 10 weight percent or less, and most preferably 5 weight percent or less, of the total weight (100 weight percent) of the cationically curable compounds contained in the curable composition. The curable composition, if containing the other cationically curable compounds in a content greater than the range, tends to less offer the advantageous effects of the present invention.

Onium Borate Salt (C)

A cationic-polymerization initiator is a compound that has the function of generating an acid via the application of light and/or heat to promote polymerization of cationically curable compounds. The cationic-polymerization initiator includes a cationic moiety and an anionic moiety, where the cationic moiety absorbs light or heat, and the anionic moiety acts as an acid source.

The curable composition according to the present invention contains an onium borate salt (C) represented by Formula (c), where the onium borate salt (C) is a cationic-polymerization initiator. Formula (c) is expressed as follows:

[Chem. 7]

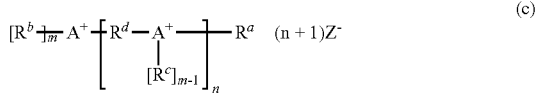
(c)

The curable composition thereby has excellent thin-film curability and, via the application of light and/or heat, can form a cured product that has heat resistance and thermal yellowing resistance both at excellent levels.

Examples of the onium borate salt (C) include the cationic-polymerization initiators described in JP-A No. 2011-201803. The onium borate salt (C) represented by Formula (c) contains, as anionic moieties, (n+1) occurrences of onium counter ions represented by $Z^-$ per molecule. At least one of the (n+1) occurrences of $Z^-$ is a borate anion represented by Formula (c-1) below.

Anionic Moiety

The anionic moiety or moieties of the onium borate salt include a borate anion represented by Formula (c-1):

(c-1)

where Y is selected from $C_6$-$C_{30}$ aryl and a $C_4$-$C_{30}$ heterocyclic group, each of which may have one or more substituents (excluding halogen-containing groups); Phf represents a group resulting from replacing at least one of hydrogen atoms of phenyl with at least one selected from perfluoroalkyl, perfluoroalkoxy, and halogen; and k is an integer of 1 to 3.

Non-limiting examples of the $C_6$-$C_{30}$ aryl as Y include phenyl, biphenylyl, naphthyl, anthracenyl, and phenanthryl.

Non-limiting examples of the $C_4$-$C_{30}$ heterocyclic group as Y are as with the examples for the monovalent heterocyclic group as $R^e$ in Formula (b).

Y may have one or more substituents. The "substituents" herein are groups excluding halogen-containing groups and are exemplified by, but not limited to, $C_1$-$C_{12}$ alkyls, $C_3$-$C_6$ cycloalkyls, $C_1$-$C_6$ alkoxys, $C_1$-$C_6$ alkylthios, $C_6$-$C_{12}$ arylthios, $C_2$-$C_7$ alkylcarbonyls, $C_2$-$C_7$ alkoxycarbonyls, phenyl, and benzoyl. When Y has two or more substituents, the substituents may be identical or different.

The perfluoroalkyl is preferably selected from $C_1$-$C_8$ (preferably $C_1$-$C_4$) perfluoroalkyls and is exemplified by, but not limited to, linear $C_1$-$C_8$ perfluoroalkyls such as trifluoromethyl, pentafluoroethyl, heptafluoropropyl, nonafluorobutyl, perfluoropentyl, and perfluorooctyl; branched chain $C_3$-$C_8$ (preferably $C_3$ or $C_4$) perfluoroalkyls such as heptafluoroisopropyl and nonafluoroisobutyl; and $C_3$-$C_8$ (preferably $C_3$ or $C_4$) perfluorocycloalkyls such as perfluorocyclopropyl and perfluorocyclobutyl.

The perfluoroalkoxy is preferably selected from $C_1$-$C_8$ (preferably $C_1$-$C_4$) perfluoroalkoxys and is exemplified by, but not limited to, linear $C_1$-$C_8$ (preferably $C_1$-$C_4$) perfluoroalkoxys such as trifluoromethoxy, pentafluoroethoxy, heptafluoropropoxy, nonafluorobutoxy, perfluoropentyloxy, and perfluorooctyloxy; and branched chain $C_3$-$C_8$ (preferably $C_3$ or $C_4$) perfluoroalkoxys such as heptafluoroisopropoxy and nonafluoroisobutoxy.

Non-limiting examples of the halogen include fluorine, chlorine, bromine, and iodine.

Among them, Y is preferably selected from $C_6$-$C_{30}$ aryls, and particularly preferably selected from phenyl ($C_6H_5$) and biphenylyl ($C_6HC_6H_4$).

Non-limiting examples of Phf include pentafluorophenyl ($C_6F_5$), trifluorophenyl ($C_6H_2F_3$), tetrafluorophenyl ($C_6HF_4$), trifluoromethylphenyl ($CF_3C_6H_4$), bis(trifluoromethyl)phenyl (($CF_3$)$_2C_6H_3$), pentafluoroethylphenyl ($CF_3CF_2C_6H_4$), bis(pentafluoroethyl)phenyl (($CF_3CF_2$)$_2C_6H_3$), fluoro-trifluoromethylphenyl ($CF_3C_6H_3F$), fluoro-bis(trifluoromethyl)phenyl (($CF_3$)$_2C_6H_2F$), fluoro-pentafluoroethylphenyl ($CF_3CF_2C_6H_3F$), and fluoro-bis(pentafluoroethyl)phenyl (($CF_3CF_2$)$_2C_6H_2F$). In particular, Phf herein is preferably selected from pentafluorophenyl ($C_6F_5$) and fluoro-bis(pentafluoroethyl)phenyl (($CF_3CF_2$)$_2C_6H_2F$) This is preferred because the resulting curable composition offers excellent thin-film curability and can give a cured product that has heat resistance and thermal yellowing resistance at particularly excellent levels.

The anionic moiety or moieties are preferably selected typically from [($C_6H_5$)B($C_6F_5$)]$^-$, [($C_6H_5$)B(($CF_3CF_2$)$_2$ $C_6H_2F$)$_3$]$^-$, and [($C_6H_5C_6H_4$)B($C_6F_5$)$_3$]$^-$.

The onium borate salt contains (n+1) anion or anions, where at least one of the anions is the borate anion represented by Formula (c-1), and the other may be another anion than the borate anion. Non-limiting examples of the other anion include halogen ions such as $F^-$, $Cl^-$, $Br^-$, and $I^-$; $OH^-$; $ClO_4^-$; sulfonate ions such as $FSO_3^-$, $ClSO_3^-$, $CH_3SO_3^-$, $C_6H_5SO_3^-$, $C_6F_5SO_3^-$, and $CF_3SO_3^-$; sulfate ions such as $HSO_4^-$ and $SO_4^{2-}$; carbonate ions such as $HCO_3^-$ and $CO_3^{2-}$; phosphate ions such as $H_2PO_4^-$, $HPO_4^{2-}$, and $PO_4^{3-}$; fluorophosphate ions such as $PF_6^-$, $PF_5OH^-$, $PF_3(CF_3)_3^-$, $PF_3(C_2F_5)_3^-$, and $PF_3(C_3F_7)_3^-$; borate ions such as $BF_4^-$, $B(C_6F_5)_4^-$, and $B(C_6H_4CF_3)_4^-$; $AlCl_4^-$; and $BiF_6^-$.

Cationic Moiety

The cationic moiety of the onium borate salt is represented by Formula (c-2):

[Chem. 8]

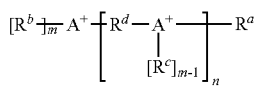

where "A" represents a m-valent atom selected from sulfur (S), iodine (I), and selenium (Se) atoms; $R^a$, $R^b$, and $R^c$ are monovalent groups and are each, identically or differently in each occurrence, selected from a $C_1$-$C_{30}$ hydrocarbon group, a $C_4$-$C_{30}$ heterocyclic group, and a group including two or more of these groups bonded to each other through a single bond or a linkage group, each of which groups may have one or more substituents; $R^d$ is a divalent group and is selected from a $C_1$-$C_{30}$ hydrocarbon group, a $C_4$-$C_{30}$ heterocyclic group, and a group including two or more of these groups bonded to each other through a single bond or a linkage group, each of which groups may have one or more substituents, where the linkage group is selected from —O—, —S—, —SO—, —SO$_2$—, —NH—, —NR'— (where R' is selected from $C_1$-$C_5$ alkyl and $C_6$-$C_{10}$ aryl), —CO—, —COO—, —CONH—, and $C_1$-$C_3$ alkylene; and n is selected from 0 and 1.

The "A" represents a m-valent atom (where m is 1 or 2) selected from sulfur (S) atom (m=2), iodine (I) atom (m=1), and selenium (Se) atom (m=2). In the present invention, "A" is preferably selected from sulfur (S) and iodine (I) atoms and is particularly preferably a sulfur (S) atom, for excellent flexibility.

Non-limiting examples of the monovalent $C_1$-$C_{30}$ hydrocarbon group as $R^a$, $R^b$, and $R^c$ include $C_6$-$C_{30}$ aryls such as phenyl, naphthyl, anthracenyl, and phenanthryl; linear or branched $C_1$-$C_{30}$ (preferably $C_1$-$C_8$) alkyls such as methyl, ethyl, propyl, and isopropyl; $C_2$-$C_{30}$ (preferably $C_2$-$C_8$) alkenyls such as vinyl, allyl, 1-propenyl, and isopropenyl; and $C_2$-$C_{30}$ (preferably $C_2$-$C_8$) alkynyls such as ethynyl, 1-propynyl, 2-propynyl, and 1-butynyl.

Non-limiting examples of the monovalent $C_4$-$C_{30}$ heterocyclic group as $R^a$, $R^b$, and $R^c$ are as with the examples for the monovalent heterocyclic group as $R^e$ in Formula (b).

The m occurrence(s) of $R^b$ may be identical or different.

The monovalent group, as $R^a$, $R^b$, and $R^c$, including the groups bonded to each other through a single bond or a linkage group is a monovalent group including two or more groups selected from hydrocarbon groups and heterocyclic groups bonded to each other through a single bond or a linkage group. Non-limiting examples of the monovalent group include groups represented by the formulae:

[Chem. 9]

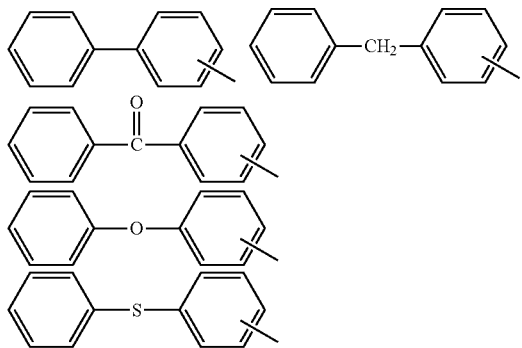

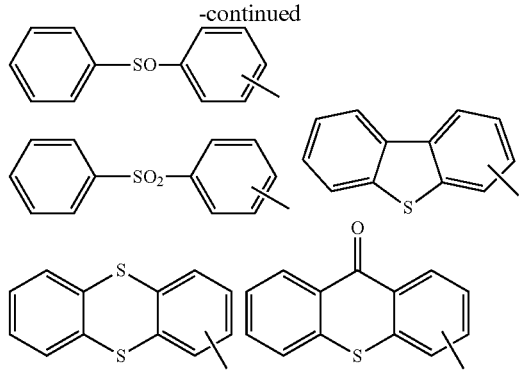

$R^a$, $R^b$, and $R^c$ may each have one or more substituents. Non-limiting examples of the substituents include $C_1$-$C_{18}$ linear or branched alkyls; $C_3$-$C_{18}$ cycloalkyls; hydroxy; $C_1$-$C_{18}$ linear or branched alkoxys; $C_2$-$C_{18}$ linear or branched alkylcarbonyls; $C_7$-$C_{11}$ arylcarbonyls; $C_2$-$C_{19}$ linear or branched alkoxycarbonyls; $C_7$-$C_{11}$ aryloxycarbonyls; $C_7$-$C_{11}$ arylthiocarbonyls; $C_1$-$C_{19}$ linear or branched acyloxys; $C_6$-$C_{20}$ arylthios; $C_1$-$C_{18}$ linear or branched alkylthios; $C_6$-$C_{10}$ aryls; $C_4$-$C_{20}$ heterocyclic groups; $C_6$-$C_{20}$ aryloxys; $C_1$-$C_{18}$ linear or branched alkylsulfinyls; $C_6$-$C_{10}$ arylsulfinyls; $C_1$-$C_{18}$ linear or branched alkylsulfonyls; $C_6$-$C_{10}$ arylsulfonyls; $C_1$-$C_{12}$ alkyleneoxys; glycidyloxy; oxetanylmethyloxy; vinyloxyethoxy; amino; aminos mono- or di-substituted with at least one of $C_1$-$C_5$ alkyls and $C_6$-$C_{10}$ aryls; cyano; nitro; and halogens.

$R^d$ is a divalent group and is selected from a $C_1$-$C_{30}$ hydrocarbon group, a $C_4$-$C_{30}$ heterocyclic group, and a group including two or more of these groups bonded to each other through a single bond or a linkage group, each of which groups may have one or more substituents. Non-limiting examples of $R^d$ include groups resulting from removing one hydrogen atom each from the structural formulae of the monovalent groups as $R^a$, $R^b$, and $R^c$.

Of the cations represented by Formula (c-2), preferred, but non-limiting examples of cations capable of functionally absorbing light include arylsulfonium ions such as triphenylsulfonium, tri-p-tolylsulfonium, tri-o-tolylsulfonium, tris(4-methoxyphenyl)sulfonium, 1-naphthyldiphenylsulfonium, 2-naphthyldiphenylsulfonium, tris(4-fluorophenyl) sulfonium, tri-1-naphthylsulfonium, tri-2-naphthylsulfonium, tris(4-hydroxyphenyl)sulfonium, [4-(phenylthio)phenyl]diphenylsulfonium, [4-(p-tolylthio)phenyl]di-p-tolylsulfonium, 4-(4-methoxyphenylthio)phenylbis(4-methoxyphenyl) sulfonium, 4-(phenylthio)phenylbis(4-fluorophenyl) sulfonium, 4-(phenylthio)phenylbis(4-methoxyphenyl) sulfonium, [4-(phenylthio)phenyl]di-p-tolylsulfonium, bis[4-(diphenylsulfonio)phenyl]sulfide, bis [4-{bis[4-(2-hydroxyethoxy)phenyl]sulfonio}phenyl] sulfide, bis{4-[bis(4-fluorophenyl)sulfonio]phenyl}sulfide, bis{4-[bis(4-methylphenyl)sulfonio]phenyl}sulfide, bis{4-[bis(4-methoxyphenyl)sulfonio]phenyl}sulfide, 4-(4-benzoyl-2-chlorophenylthio)phenylbis(4-fluorophenyl)sulfonium, [4-(4-benzoyl-2-chlorophenylthio)phenyl] diphenylsulfonium, 4-(4-benzoylphenylthio)phenylbis(4-fluorophenyl)sulfonium, [4-(4-benzoylphenylthio)phenyl] diphenylsulfonium, 7-isopropyl-9-oxo-10-thia-9, 10-dihydroanthr-2-yl-di-p-tolylsulfonium, 7-isopropyl-9-oxo-10-thia-9, 10-dihydroanthr-2-yl-diphenylsulfonium, 2-[(di-p-tolyl)sulfonio]thioxanthone, 2-[(diphenyl)sulfonio] thioxanthone, [4-[4-(4-t-butylbenzoyl)phenylthio]phenyl] di-p-tolylsulfonium, [4-[4-(4-t-butylbenzoyl)phenylthio]

phenyl]diphenylsulfonium, 4-[4-(benzoylphenylthio)] phenyl-di-p-tolylsulfonium, [4-[4-(benzoylphenylthio)] phenyl]diphenylsulfonium, 5-(4-methoxyphenyl) thianthrenium, 5-phenylthianthrenium, 5-tolylthianthrenium, 5-(4-ethoxyphenyl)thianthrenium, 5-(2,4,6-trimethylphenyl)thianthrenium, [4-(4-biphenylylthio)phenyl]-4-biphenylylphenylsulfonium, and [4-(2-thioxanthonylthio)phenyl]phenyl-2-thioxanthonylsulfonium.

These are preferred because of excellent flexibility. Among them, particularly preferred are triarylsulfonium ions of Formula (c-2) in which groups (such as $R^a$, $R^b$, $R^c$, and $R^d$) bonded to $A^+$ are each independently selected from $C_6$-$C_{30}$ aryl and a group including two or more aryls bonded to each other through a single bond or a linkage group. In particular, preferred are 4-(phenylthio)phenyldiphenylsulfonium, bis[4-(diphenylsulfonio)phenyl]sulfide, [4-(4-biphenylylthio)phenyl]-4-biphenylylphenylsulfonium, and [4-(2-thioxanthonylthio)phenyl]phenyl-2-thioxanthonylsulfonium.

Of the cations represented by Formula (c-2), non-limiting examples of the cations capable of functionally absorbing heat include monoarylsulfonium ions of Formula (c-2) in which one group selected from the groups (such as $R^a$, $R^b$, $R^c$, and $R^d$) bonded to $A^+$ is selected from $C_6$-$C_{30}$ aryl and a group including two or more aryls bonded to each other through a single bond or a linkage group, such as 4-hydroxyphenyl-methyl-benzylsulfonium, 4-hydroxyphenyl-methyl-(2-methylbenzyl)sulfonium, 4-hydroxyphenyl-methyl-1-naphthylmethylsulfonium, and p-methoxycarbonyloxyphenyl-benzyl-methylsulfonium.

Of the onium borate salts (C), compounds capable of functionally generating an acid by light irradiation to accelerate polymerization of cationically curable compounds act as cationic photopolymerization initiators. Specific, but non-limiting examples of the compounds of this category include 4-(phenylthio)phenyldiphenylsulfonium phenyltris(pentafluorophenyl)borate, bis[4-(diphenylsulfonio)phenyl]sulfide phenyltris(pentafluorophenyl)borate, [4-(4-biphenylylthio)phenyl]-4-biphenylylphenylsulfonium phenyltris(pentafluorophenyl)borate, and [4-(2-thioxanthonylthio)phenyl]phenyl-2-thioxanthonylsulfonium phenyltris(pentafluorophenyl)borate.

Of the onium borate salts (C), compounds capable of functionally generating an acid by a heat treatment to accelerate polymerization of cationically curable compounds act as cationic thermal polymerization initiators. Specific, but non-limiting examples of the compounds of this category include 4-hydroxyphenyl-methyl-benzylsulfonium phenyltris(pentafluorophenyl)borate, 4-hydroxyphenyl-methyl-(2-methylbenzyl)sulfonium phenyltris(pentafluorophenyl)borate, 4-hydroxyphenyl-methyl-1-naphthylmethylsulfonium phenyltris(pentafluorophenyl)borate, and p-methoxycarbonyloxyphenyl-benzyl-methylsulfonium phenyltris(pentafluorophenyl)borate.

The curable composition according to the present invention may contain the cationic-polymerization initiator in a proportion of typically 0.1 to 10.0 parts by weight, preferably 0.1 to 5.0 parts by weight, particularly preferably 0.2 to 3.0 parts by weight, and most preferably 0.5 to 2.5 parts by weight, per 100 parts by weight of the cationically curable compounds contained in the curable composition. When the curable composition contains two or more different compounds of this category, the term "content" refers to the total content of them. The curable composition, if containing the cationic-polymerization initiator in a content less than the range, tends to offer lower curability. In contrast, the curable composition, if containing the cationic-polymerization initiator in a content greater than the range, tends to offer lower thermal yellowing resistance.

The curable composition according to the present invention may contain the onium borate salt (C) in a proportion of typically 0.1 to 10.0 parts by weight, preferably 0.1 to 5.0 parts by weight, particularly preferably 0.2 to 3.0 parts by weight, and most preferably 0.5 to 2.5 parts by weight, per 100 parts by weight of (the total weight when two or more different cationically curable compounds are contained) the cationically curable compounds contained in the curable composition.

The curable composition according to the present invention may further contain one or more other cationic-polymerization initiators in addition to the onium borate salt (C). However, the curable composition according to the present invention may contain the onium borate salt (C) in a content of typically 50 weight percent or more, preferably 70 weight percent or more, and particularly preferably 80 weight percent or more, of the total weight of all cationic-polymerization initiators contained in the curable composition.

Other Components

The curable composition according to the present invention may further contain one or more other components in addition to the cationically curable compounds and the cationic-polymerization initiator, within such ranges as not to adversely affect the advantageous effects of the present invention. Non-limiting examples of the other components include antioxidants, fillers, photosensitizers, antifoaming agents, leveling agents, coupling agents, surfactants, flame retardants, ultraviolet absorbers, decolorizing agents, adhesion imparting agents, and colorants. The curable composition may contain each of these components alone or in combination.

In particular, the curable composition according to the present invention preferably contains (D) an antioxidant.

This configuration is preferred for effectively allowing the cured product to have better thermal yellowing resistance.

Non-limiting examples of the antioxidant include phenolic antioxidants, phosphorus antioxidants, thio ester antioxidants, and amine antioxidants. The curable composition may contain each of different antioxidants alone or in combination. Among them, the curable composition according to the present invention preferably contains an antioxidant selected from phenolic antioxidants, for effectively better thermal yellowing resistance.

Non-limiting examples of the phenolic antioxidants include pentaerythritol tetrakis[3-(3,5-di-t-butyl-4-hydroxyphenyl)propionate], thiodiethylene bis[3-(3,5-di-t-butyl-4-hydroxyphenyl)propionate], octadecyl 3-(3,5-di-t-butyl-4-hydroxyphenyl)propanoate, N,N'-hexamethylenebis[3-(3,5-di-t-butyl-4-hydroxyphenyl)propionamide], octyl 3-(4-hydroxy-3,5-diisopropylphenyl)propionate, 1,3,5-tris(4-hydroxy-3,5-di-t-butylbenzyl)-2,4,6-trimethylbenzene, 2,4-bis(dodecylthiomethyl)-6-methylphenol, and calcium bis[3,5-di(t-butyl)-4-hydroxybenzyl(ethoxy)phosphinate]. Such antioxidants for use in the present invention may be selected from commercial products available typically under the trade names of Irganox 1010, Irganox 1035, Irganox 1076, Irganox 1098, Irganox 1135, Irganox 1330, Irganox 1726, and Irganox 1425WL (each from BASF SE).

The curable composition may contain the antioxidant in a proportion of typically 0.05 to 5.0 parts by weight, and preferably 0.1 to 3.0 parts by weight, per 100 parts by weight of the total weight of (the total weight when two or more different cationically curable compounds are contained) cationically curable compounds contained in the curable composition.

The curable composition according to the present invention may contain any of fillers offering a variety of functions (such as insulating properties, strength, viscosity, flame retardancy, conductivity, brightness, and antimicrobic activity). The fillers include inorganic fillers and organic fillers.

Non-limiting examples of the inorganic fillers include calcium carbonate, magnesium carbonate, clay, kaolin, calcium phosphate, hydroxyapatite, mica, talc, silica, quartz powder, glass powder, diatomaceous earth, nepheline syenite, cristobalite, wollastonite, aluminum hydroxide, iron oxides, zinc oxide, titanium oxides, alumina, calcium sulfate, barium sulfate, dolomite, silicon carbide, silicon nitride, boron nitride, metal powders, graphite, carbon black, hydroxyapatite/silver, and zeolite/silver. Non-limiting examples of the organic fillers include granules of various polymers such as cross-linked poly(methyl methacrylate)s. The curable composition may contain each of different fillers alone or in combination.

The filler surface may have undergone treatment with a coupling agent (surface-treatment agent) such as a silane coupling agent.

The filler may have any shape not limited, such as a spherical, ellipsoidal, cylindrical, or prismatic shape.

The particle size of the filler can be selected as appropriate according to the intended use within a range not adversely affecting dispersibility. The filler may have a diameter or major axis of typically about 0.001 to about 50 µm.

The curable composition may contain the filler particles in a proportion of typically 1 to 30 parts by weight, and preferably 5 to 20 parts by weight, per 100 parts by weight of (the total weight when two or more different cationically curable compounds are contained) the cationically curable compounds contained in the curable composition.

The curable composition according to the present invention may contain a colorant. The colorant (or coloring agent) includes pigments and dyes. The curable composition may contain each of different colorants alone or in combination.

Non-limiting examples of the pigments include inorganic pigments, organic pigments, and pigments including inorganic pigments coated with organic materials such as resins. Non-limiting examples of the inorganic pigments include carbon black, chromium oxide, iron oxide, black titanium oxide, acetylene black, lamps black, bone black, graphite, iron black, copper-chromium black, copper-iron-manganese black, cobalt-iron-chromium black, ruthenium oxide, graphite, fine particles of metals (such as aluminum), fine particles of metal oxides, fine particles of complex oxides, fine particles of metal sulfides, and fine particles of metal nitrides. Non-limiting examples of the organic pigments include perylene black, cyanine black, aniline black, azo pigments, anthraquinone pigments, isoindolinone pigments, indanthrene pigments, indigo pigments, quinacridone pigments, dioxazine pigments, tetraazaporphyrin pigments, triarylmethane pigments, phthalocyanine pigments, perylene pigments, benzimidazolone pigments, and rhodamine pigments.

Examples of the dyes include, but are not limited to, azo dyes, anthraquinone dyes, indigo dyes, carbonyl dyes, xanthene dyes, quinonimine dyes, quinoline dyes, tetraazaporphyrin dyes, triarylmethane dyes, naphthoquinone dyes, nitro dyes, phthalocyanine dyes, fluoran dyes, perylene dyes, methine dyes, and rhodamine dyes. Non-limiting examples of the anthraquinone dyes include Acid Violet 39, Acid Violet 41, Acid Violet 42, Acid Violet 43, Acid Violet 48, Acid Violet 51, Acid Violet 34, Acid Violet 47, Acid Violet 109, Acid Violet 126, Basic Violet 24, Basic Violet 25, Disperse Violet 1, Disperse Violet 4, Disperse Violet 26, Disperse Violet 27, Disperse Violet 28, Disperse Violet 57, Solvent Violet 11, Solvent Violet 13, Solvent Violet 14, Solvent Violet 26, Solvent Violet 28, Solvent Violet 31, Solvent Violet 36, Solvent Violet 37, Solvent Violet 38, Solvent Violet 48, Solvent Violet 59, Solvent Violet 60, Vat Violet 13, Vat Violet 15, and Vat Violet 16.

The content of the colorant can be adjusted as appropriate according to the intended use and is typically about 10 to about 300 ppm, of the total amount of the curable composition according to the present invention. The lower limit of the content is preferably 50 ppm, and particularly preferably 100 ppm. When the curable composition contains two or more different colorants, the term "content" refers to the total content of them.

Curable Composition

The curable composition according to the present invention contains cationically curable compounds including the epoxy compound (A) and the oxetane compound (B), where the epoxy compound (A) includes the compound represented by Formula (a). The curable composition further contains a cationic-polymerization initiator including the onium borate salt (C). The curable composition according to the present invention can be prepared by stirring and blending the components in predetermined proportions and, as needed, debubbling the resulting mixture in a vacuum.

The curable composition according to the present invention may have a viscosity (at 25° C. and a shear rate of 20 $s^{-1}$) as adjusted according to the intended use within the range of typically 50 to 3000 mPa·s, and preferably 50 to 1000 mPa·s.

The curable composition according to the present invention is cationically curable satisfactorily. The curable composition can be rapidly cured to give a cured product by light irradiation when the curable composition contains an onium borate salt (C) capable of functionally generating an acid via light irradiation, or by a heat treatment when the curable composition contains an onium borate salt (C) capable of functionally generating an acid via a heat treatment.

The light (actinic radiation) for use in the light irradiation has only to be such light as to allow the polymerization reaction of the curable composition to proceed. For example, the light may be selected from infrared rays, visible light, ultraviolet rays, X rays, electron beams, alpha rays, beta rays, gamma rays, and any other light or rays. Among them, the light for use in the present invention is preferably selected from ultraviolet rays because these rays can be handled satisfactorily. Such ultraviolet irradiation may be performed using any of illuminants such as UV-LEDs (wavelength: 350 to 450 nm), high-pressure mercury lamps, ultra-high pressure mercury lamps, xenon lamps, carbon arc, metal halide lamps, sunlight, and laser (laser systems).

Assume that an ultraviolet ray is applied. In this case, the light irradiance in terms of integrated irradiance is preferably adjusted typically at 5000 mJ/cm$^2$ or less (e.g., 2500 to 5000 mJ/cm$^2$). After the ultraviolet irradiation, the curable composition is preferably left stand at room temperature (1° C. to 30° C.) for about 1 to about 48 hours.

This is preferred for better curability.

The heat treatment may be performed by heating at a temperature of typically 80° C. to 180° C. for about 15 to 180 minutes.

The curable composition according to the present invention contains the onium borate salt (C) as a cationic-polymerization initiator and thereby offers excellent thin-film curability. The curable composition can rapidly undergo a curing reaction to form a cured product even having a thickness of typically 50 µm or less (preferably 10 to 30 µm). Assume that the curable composition contains an onium borate salt (C) capable of functionally generating an acid via light irradiation. In this case, the curable composition can rapidly undergo a curing reaction to form a cured product even by irradiation with light from a UV-LED.

The curable composition according to the present invention, when cured, gives a cured product which has excellent heat resistance and has a 5% weight loss temperature of typically 260° C. or higher, preferably 280° C. or higher, and particularly preferably 300° C. or higher, where the 5% weight loss temperature may be determined by simultaneous thermogravimetry/differential thermal analysis (TG-DTA). This configuration allows the cured product to maintain its shape even under high-temperature conditions such as reflow soldering conditions.

The cured product of the curable composition according to the present invention offers excellent transparency and has a yellowness index (YI) of typically 1.0 or less before a heat test. In addition, the cured product of the curable composition according to the present invention resists yellowing and can maintain its transparency even under high-temperature conditions such as reflow soldering conditions and has a yellowness index (YI) of typically 2.0 or less, and preferably less than 1.5 after the heat test. The yellowness index may be measured by a method as described in experimental examples below.

The curable composition according to the present invention has all the properties and is advantageously usable typically as or for optical element materials such as lens or prism materials, encapsulants (sealants), optical waveguide-forming materials, adhesives, optical fiber-forming materials, imprinting materials, and alternative glass-forming materials; resists; and coating agents.

Optical Element

An optical element according to the present invention includes a cured product of the curable composition as a constituent. The optical element according to the present invention therefore combines curability with heat resistance and thermal yellowing resistance all at excellent levels.

Non-limiting examples of the optical element according to the present invention include lenses, prisms, LEDs, organic electroluminescence elements, semiconductor laser elements, transistors, solar cells, CCD image sensors, optical waveguides, optical fibers, and alternative glass such as display substrates, hard disk drive substrates, and polarizing films.

The optical element according to the present invention has excellent heat resistance. The optical element can therefore be mounted onto a substrate together with other components collectively by a reflow process. In addition, the optical element is also usable in or for on-vehicle electronic devices, which require heat resistance.

Optical Device

An optical device according to the present invention includes the optical element and can be produced typically by mounting the optical element onto a substrate by reflow soldering. Non-limiting examples of the optical device according to the present invention include portable electronic devices such as cellular phones, smartphones, and tablet personal computers; and on-vehicle electronic devices such as near-infrared sensors, millimeter-wave radars, LED spotlighting devices, near-infrared LED lighting devices, mirror monitors, meter panels, head-mounted (projection) display combiners, and head-up display combiners. The optical device according to the present invention can be produced efficiently and inexpensively because the optical element does not have to be mounted in another extra process, but can be mounted together with other components or parts collectively by a reflow process.

EXAMPLES

The present invention will be illustrated in further detail with reference to several examples below. It should be noted, however, that the examples are by no means intended to limit the scope of the present invention.

Production Example 1

Production of (3,4,3',4'-diepoxy)bicyclohexyl (a-1)

A dehydration catalyst was prepared by stirring and mixing 70 g (0.68 mol) of 95 weight percent sulfuric acid with 55 g (0.36 mol) of 1,8-diazabicyclo[5.4.0]undecene-7 (DBU).

A 3-L flask equipped with a stirrer, a thermometer, and a distillation pipe packed with a dehydrating agent and being thermally insulated was charged with 1000 g (5.05 mol) of hydrogenated biphenol (4,4'-dihydroxybicyclohexyl), 125 g (0.68 mol in terms of sulfuric acid) of the above-prepared dehydration catalyst, and 1500 g of pseudocumene, followed by heating of the flask. Water production was observed from around the time point when the internal temperature became higher than 115° C. The heating was further continued to raise the temperature up to the boiling point of pseudocumene (internal temperature: 162° C. to 170° C.), followed by a dehydration reaction at normal atmospheric pressure. The by-produced water was distilled off and discharged through a dehydration tube out of the system.

The dehydration catalyst was liquid under the reaction conditions and finely dispersed in the reaction mixture (reaction liquid). An approximately stoichiometric amount (180 g) of water was distilled after a lapse of 3 hours, and this was defined as reaction completion.

The reaction mixture upon the reaction completion was subjected to distillation using an Oldershaw distilling column including 10 plates to distill off pseudocumene, was further subjected to distillation at an internal temperature of 137° C. to 140° C. and an internal pressure of 10 Torr (1.33 kPa), and yielded 731 g of bicyclohexyl-3,3'-diene.

Into a reactor, 243 g of the prepared bicyclohexyl-3,3'-diene and 730 g of ethyl acetate were charged, and 274 g of a 30 weight percent solution (moisture content: 0.41 weight percent) of peracetic acid in ethyl acetate were added dropwise over about 3 hours while nitrogen was blown into the gas phase and the internal temperature of the reaction system was controlled to 37.5° C. After the completion of the dropwise addition, aging was performed at 40° C. for one hour, and the reaction was completed. The crude mixture upon the reaction completion was washed with water at 30° C., from which low-boiling compounds were removed at 70° C. and 20 mmHg, and yielded 270 g of a reaction product.

The reaction product was found to have an oxirane oxygen content of 15.0 weight percent. A $^1$H-NMR measurement revealed that a peak at a δ of about 4.5 to about 5 ppm assigned to an internal double bond disappeared; but a peak at a δ of about 3.1 ppm assigned to an epoxy-derived proton appeared. On the basis of these, the reaction product was identified as (3,4,3',4'-diepoxy)bicyclohexyl.

Production Example 2

Production of bis(3,4-epoxycyclohexylmethyl) ether (a-2)

Sodium hydroxide (granular) (499 g, 12.48 mol) and toluene (727 mL) were charged into a 5-L reactor. After nitrogen purge, a solution of tetrahydrobenzyl alcohol (420 g, 3.74 mol) in toluene (484 mL) was added, followed by aging at 70° C. for 1.5 hours. Next, tetrahydrobenzyl methanesulfonate (419 g, 2.20 mol) was added, the resulting mixture was aged under reflux for 3 hours, cooled down to room temperature, and combined with water (1248 g) to quench the reaction. An organic layer was separated, concentrated, subjected to distillation under reduced pressure, and yielded ditetrahydrobenzyl ether as a colorless, transparent liquid in a yield of 85%. The prepared ditetrahydrobenzyl ether was subjected to $^1$H-NMR spectrum measurement. $^1$H-NMR (CDCl$_3$): δ 1.23-1.33 (m, 2H), 1.68-1.94 (m, 6H), 2.02-2.15 (m, 6H), 3.26-3.34 (m, 4H), 5.63-7.70 (m, 4H)

The prepared ditetrahydrobenzyl ether (200 g, 0.97 mol), a 20 weight percent solution of SP-D (in acetic acid) (0.39 g), and ethyl acetate (669 mL) were charged into a reactor, followed by temperature rise up to 40° C. Next, a solution (608 g) of 29.1 weight percent peracetic acid in ethyl acetate were added dropwise over 5 hours, followed by aging for 3 hours. The resulting organic layer was washed with an alkaline aqueous solution three times and with ion-exchanged water two times, subjected to distillation under reduced pressure, and yielded bis(3,4-epoxycyclohexylmethyl) ether as a colorless, transparent liquid in a yield of 77%.

Production Example 3

Production of 2,2-bis(3,4-epoxycyclohex-1-yl)propane (a-3)

In a 1-liter jacketed flask equipped with a stirrer, a condenser, a thermometer, and a nitrogen inlet tube, 36 g of water, 12.0 g of sodium hydrogensulfate, 500 g of isopropylidene-4,4'-dicyclohexanol (supplied by Aldrich), and 500 g of Solvesso 150 (supplied by Exxon Mobile Corporation) as a solvent were placed, followed by a dehydration reaction at 100° C. The reaction was completed at the time point when water was ceased to be distilled.

The reaction mixture was analyzed by gas chromatography to find that 2,2-bis(3,4-cyclohexenyl)propane was formed in a yield of 96%. The reaction mixture was washed with 500 ml of ion-exchanged water using a separatory funnel, of which an organic layer was subjected to distillation under reduced pressure, and yielded 387.0 g of 2,2-bis(3,4-cyclohexenyl)propane as a colorless, transparent liquid with a purity of 96.1%.

In a 1-L jacketed flask as above, 100 g of the prepared 2,2-bis(3,4-cyclohexenyl)propane and 30 g of ethyl acetate were charged. The mixture was combined with 307.2 g of a 29.1 weight percent solution (moisture content: 0.47 weight percent) of peracetic acid in ethyl acetate added dropwise over about 2 hours in such a manner that the temperature in the reaction system was kept at 30° C., while nitrogen was blown into the gas phase portion. After completion of dropwise addition, the resulting mixture was aged at 30° C. for 3 hours, and the reaction was completed. Further, the mixture upon completion of the reaction at 30° C. was washed with water, from which low-boiling-point components were removed at 70° C. and 20 mmHg, and yielded 99.4 g of 2,2-bis(3,4-epoxycyclohex-1-yl)propane.

The prepared product had, as properties, an oxirane oxygen content of 11.3% and a viscosity of 3550 cP (25° C.). The $^1$H-NMR spectrum of the product demonstrated that a peak at a δ of about 4.5 to about 5 ppm assigned to an internal double bond disappeared, but a peak at a δ of about 2.9 to about 3.1 ppm assigned to an epoxy-derived proton appeared.

Examples 1 to 6 and Comparative Examples 1 to 4

Components as given in Table 1 below were blended according to the formulations (in part by weight), stirred and mixed at room temperature using a planetary centrifugal mixer, and yielded uniform, transparent curable compositions. The prepared curable compositions were evaluated according to evaluation methods as follows.

Curability

Spacers (0.03 mm in size) were placed at both ends of a glass slide (trade name S9112, supplied by Matsunami Glass Ind., Ltd.), and a sample curable composition was added dropwise onto the center of the glass slide. The curable composition was spread out so as to have a thickness of 0.03 mm using a squeegee and irradiated with light using a UV-LED or a high-pressure mercury lamp under the following conditions. After the light irradiation, the curable composition was left stand at room temperature for 60 minutes and yielded a cured product.

Light Irradiation Conditions
UV-LED
Irradiator: trade name ZUV-C$_{20}$H (supplied by OMRON Corporation)
Wavelength: 365 nm
Irradiation intensity: 100 mW/cm
Cumulative dose: 3000 mJ/cm$^2$
High-Pressure Mercury Lamp
Irradiator: trade name LC-8 (supplied by Hamamatsu Photonics K.K.)
Irradiation intensity: 100 mW/cm
Cumulative dose: 3000 mJ/cm$^2$ The curability of the resulting cured product was examined on the basis of whether the cured product had surface tackiness. Whether the cured product had tackiness was determined by touch.

Evaluation Criteria:
Good: The cured product surface had no tackiness and was not changed in shape;
Fair: The cured product surface had no tackiness, but was changed in shape; and
Poor: The cured product surface had tackiness.

Heat Resistance

Teflon® spacers having a length of 30 mm, a width of 20 mm, and a thickness of 0.1 mm were prepared. Separately, glass slides (trade name 52111, supplied by Matsunami Glass Ind., Ltd.) were subjected to a surface release treatment in which the glass slides were immersed in Optool HD1000 (trade name, supplied by Daikin Industries Ltd.) and then left stand in a draft chamber for 24 hours. The spacers were held between a pair of the treated glass slides. A sample curable composition was charged into a space between the glass slides, irradiated with light in the same manner as above, and yielded a cured product. Heat resistance was evaluated in the following manner. Specifically, 10 mg of the cured product was cut to give a specimen, and the 5% weight loss temperature of the specimen was measured under following conditions using a TG-DTA (trade name EXSTAR 6300, supplied by Hitachi High-Tech Science Corporation).

TG-DTA Conditions

Rate of temperature rise: 20° C./min

Atmosphere: nitrogen

Temperature condition: 30° C. to 400° C.

Transparency

Teflon® spacers having a length of 20 mm, a width of 20 mm, and a thickness of 0.1 mm were prepared, and held between a pair of glass slides (trade name S2111, supplied by Matsunami Glass Ind., Ltd.). A sample curable composition was charged into a space between the glass slides, irradiated with light in the same manner as above, left stand at room temperature for 60 minutes, and yielded a cured product. The yellowness index (YI) of the prepared cured product was measured using a spectrophotometer (trade name U-3900, supplied by Hitachi High-Technologies Corporation), on the basis of which transparency was evaluated. The yellowness index (YI) was read out as a value in a 2 degree field of view using a D65 illuminant.

Thermal Yellowing Resistance

A cured product was prepared by a procedure similar to that in the transparency evaluation and was subjected successively three times to a heat treatment according to the reflow temperature profile (highest temperature: 270° C.) described in the JEDEC Standards using a table-top reflow oven (supplied by SHINAPEX CO., LTD.). The yellowness index (YI) of the resulting article was measured according to a procedure similar to above, on the basis of which thermal yellowing resistance was evaluated.

(a-2): the compound prepared in Production Example 2, bis(3,4-epoxycyclohexylmethyl) ether (a-3): the compound prepared in Production Example 3, 2,2-bis(3,4-epoxycyclohex-1-yl)propane YL983U: bisphenol-F diglycidyl ether, trade name YL983U, supplied by Mitsubishi Chemical Corporation Oxetane Compounds (B)

OXT221: 3-ethyl-3{[(3-ethyloxetan-3-yl)methoxy]methyl}oxetane, trade name ARON OXETANE OXT-221, supplied by Toagosei Co., Ltd.

OXT101: 3-ethyl-3-hydroxymethyloxetane, trade name ARON OXETANE OXT-101, supplied by Toagosei Co., Ltd.

Components (C)

(c-1): 4-(phenylthio)phenyldiphenylsulfonium phenyltris(pentafluorophenyl)borate (c-2): [4-(4-biphenylylthio)phenyl]-4-biphenylylphenylsulfonium phenyltris(pentafluorophenyl)borate CPI-100P: a 50% solution of 4-(phenylthio)phenyldiphenylsulfonium hexafluoro phosphate in propylene carbonate, trade name CPI-100P, supplied by San-Apro Ltd.

CPI-200K: a solution of a special phosphorus salt of 4-(phenylthio)phenyldiphenylsulfonium in propylene carbonate, trade name CPI-200K, supplied by San-Apro Ltd.

Antioxidant

IN1010: pentaerythritol tetrakis[3-(3,5-di-t-butyl-4-hydroxyphenyl)propionate], trade name Irganox 1010, supplied by BASF SE

TABLE 1

|  |  | Examples |  |  |  |  |  | Comparative Examples |  |  |  |
|---|---|---|---|---|---|---|---|---|---|---|---|
|  |  | 1 | 2 | 3 | 4 | 5 | 6 | 1 | 2 | 3 | 4 |
| Epoxy compound (A) | CELLOXIDE 2021P | 70 | 40 | 40 |  |  |  | 70 | 70 |  | 70 |
|  | (a-1) |  |  |  | 40 |  |  |  |  |  |  |
|  | (a-2) |  |  |  |  | 30 |  |  |  |  |  |
|  | (a-3) |  |  |  |  |  | 40 |  |  |  |  |
|  | YL983U |  | 30 | 30 | 40 | 40 | 30 |  | 30 | 70 |  |
| Oxetane compound (B) | OXT221 | 30 | 30 | 30 |  | 30 | 30 | 30 |  | 30 | 30 |
|  | OXT101 |  |  |  | 20 |  |  |  |  |  |  |
| Cationic-polymerization initiator (C) | (c-1) | 1 | 1 | 1 | 1 | 1 |  |  | 1 | 1 |  |
|  | (c-2) |  |  |  |  |  | 1 |  |  |  |  |
|  | CPI-100P |  |  |  |  |  |  | 3 |  |  |  |
|  | CPI-200K |  |  |  |  |  |  |  |  |  | 1 |
| Antioxidant (D) | IN1010 | 0.5 | 0.5 | 0.5 | 0.5 | 0.5 | 0.5 | 0.5 | 0.5 | 0.5 | 0.5 |
| Curing conditions |  | UV-LED | High-pressure mercury lamp | UV-LED | UV-LED | UV-LED | UV-LED | High-pressure mercury lamp | UV-LED | UV-LED | UV-LED |
| Evaluations | Viscosity (mPa · s) | 89 | 502 | 502 | 383 | 264 | 650 | 85 | 487 | 740 | 82 |
|  | Curability | Good | Good | Good | Good | Good | Good | Good | Fair | Fair | Poor |
|  | 5% weight loss temperature (° C.) | 334 | 339 | 330 | 322 | 318 | 327 | 199 | 368 | 372 | unmeasurable |
|  | Transparency (YI) | 0.7 | 1.0 | 0.8 | 0.7 | 0.8 | 1.0 | 1.6 | 0.8 | 48.2 |  |
|  | Thermal yellowing resistance (YI) | 0.8 | 1.3 | 0.8 | 0.5 | 0.7 | 1.1 | 2.2 | 1.5 | 50.3 |  |

* Sample according to Comparative Example 4 was unevaluable, because no cured product was obtained.

The components in Table 1 have compound names as follows.

Epoxy Compounds (A)

CELLOXIDE 2021P: 3,4-epoxycyclohexylmethyl (3,4-epoxy)cyclohexanecarboxylate, trade name CELLOXIDE 2021P, supplied by Daicel Corporation (a-1): the compound prepared in Production Example 1, (3,4,3',4'-diepoxy)bicyclohexyl

INDUSTRIAL APPLICABILITY

The curable composition according to the present invention has excellent thin-film curability and, via the application of light and/or heat, can give a cured product that has curability, transparency, heat resistance, and thermal yellowing resistance at excellent levels. The curable composition is therefore advantageously usable typically as or for optical element materials, resists, and coating agents.

The invention claimed is:

1. A curable composition comprising:
   cationically curable compounds; and
   a cationic-polymerization initiator,
   the cationically curable compounds comprising:
   (A) an epoxy compound in an amount of 10 to 90 weight percent of the total weight of the cationically curable compounds, the epoxy compound (A) comprising a compound represented by Formula (a); and
   (B) an oxetane compound in an amount of 5 to 40 weight percent of the total weight of the cationically curable compounds,
   the cationic-polymerization initiator comprising
   (C) an onium borate salt comprising an anionic moiety represented by Formula (c-1) and a cationic moiety represented by Formula (c-2),
   Formulae (a), (c-1), and (c-2) expressed as follows:

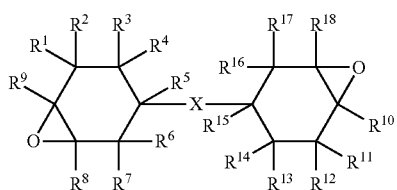

(a)

wherein $R^1$ to $R^{18}$ are each, identically or differently, selected from hydrogen, halogen, a hydrocarbon group optionally containing oxygen or halogen, and optionally substituted alkoxy;
and X is selected from a single bond and a linkage group,

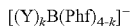 (c-1)

wherein Y is, independently in each occurrence, selected from $C_6$-$C_{30}$ aryl and a $C_4$-$C_{30}$ heterocyclic group, each of which may have one or more substituents (excluding halogen-containing) groups; Phf represents, independently in each occurrence, a group resulting from replacing at least one of hydrogen atoms of phenyl with at least one selected from the group consisting of perfluoroalkyl, perfluoroalkoxy, and halogen; and k is an integer of 1 to 3,

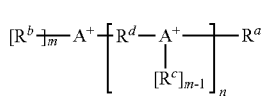 (c-2)

wherein "A" represents an m-valent atom selected from sulfur (S), iodine (I), and selenium (Se) atoms; $R^a$, $R^b$, and $R^c$ are monovalent groups and are each, identically or differently in each occurrence, selected from a $C_1$-$C_{30}$ hydrocarbon group, a $C_4$-$C_{30}$ heterocyclic group, and a group including two or more of these groups bonded to each other through a single bond or a linkage group, each of which groups may have one or more substituents; $R^d$ is a divalent group and is selected from a $C_1$-$C_{30}$ hydrocarbon group, a $C_4$-$C_{30}$ heterocyclic group, and a group including two or more of these groups bonded to each other through a single bond or a linkage group, each of which groups may have one or more substituents, where the linkage group is, independently in each occurrence, selected from —O—, —S—, —SO—, —SO$_2$—, —NH—, —NR'—where R' is selected from $C_1$-$C_5$ alkyl and $C_6$-$C_{10}$ aryl, —CO—, —COO—, —CONH—, and $C_1$-$C_3$ alkylene; m is selected from 1 or 2; and n is selected from 0 and 1,
wherein the anionic moiety of the onium borate salt (C) is selected from $[(C_6H_5)B(C_6F_5)_3]^-$, $[(C_6H_5)B(CF_3CF_2)_2C_6H_2F)_3]^-$, and $[(C_6H_5C_6H_4)B(C_6F_5)_3]^-$, and
wherein the cationic moiety of the onium borate salt (C) is selected from arylsulfonium ions.

2. The curable composition according to claim 1, wherein the epoxy compound (A) further comprises a glycidyl ether epoxy compound.

3. The curable composition according to claim 1, further comprising
   an antioxidant (D).

4. A cured product of the curable composition according to claim 1.

5. A cured product derived from the curable composition according to claim 1 via irradiation with light from a UV-LED at a wavelength of 350 to 450 nm.

6. The cured product according to claim 4, which has a thickness of 50 μm or less.

7. An optical element comprising
   the cured product according to claim 4.

8. An optical device comprising
   the optical element according to claim 7.

9. The curable composition according to claim 2, further comprising
   an antioxidant (D).

10. A cured product of the curable composition according to claim 2.

11. The curable composition according to claim 1, wherein the curable composition contains the compound represented by Formula (a) in a content of 30 to 90 weight percent of the total weight of the cationically curable compounds.

12. A curable composition comprising:
    cationically curable compounds; and
    a cationic-polymerization initiator,
    the cationically curable compounds comprising:
    (A) an epoxy compound in an amount of 10 to 90 weight percent of the total weight of the cationically curable compounds, the epoxy compound (A) comprising a compound represented by Formula (a); and
    (B) an oxetane compound in an amount of 5 to 40 weight percent of the total weight of the cationically curable compounds,
    the cationic-polymerization initiator comprising
    (C) an onium borate salt comprising an anionic moiety represented by Formula (c-1) and a cationic moiety represented by Formula (c-2),
    Formulae (a), (c-1), and (c-2) expressed as follows:

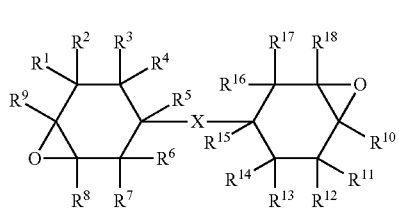

(a)

wherein $R^1$ to $R^{18}$ are each, identically or differently, selected from hydrogen, halogen, a hydrocarbon group optionally containing oxygen or halogen, and optionally substituted alkoxy;

and X is selected from a single bond and a linkage group,

 (c-1)

wherein Y is, independently in each occurrence, selected from $C_6$-$C_{30}$ aryl and a $C_4$-$C_{30}$ heterocyclic group, each of which may have one or more substituents excluding halogen-containing groups; Phf represents, independently in each occurrence, a group resulting from replacing at least one of hydrogen atoms of phenyl with at least one selected from the group consisting of perfluoroalkyl, perfluoroalkoxy, and halogen; and k is an integer of 1 to 3,

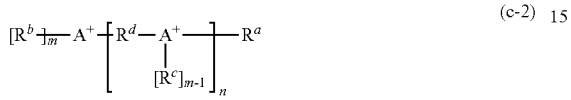 (c-2)

wherein "A" represents an m-valent atom selected from sulfur (S), iodine (I), and selenium (Se) atoms; $R^a$, $R^b$, and $R^c$ are monovalent groups and are each, identically or differently in each occurrence, selected from a $C_1$-$C_{30}$ hydrocarbon group, a $C_4$-$C_{30}$ heterocyclic group, and a group including two or more of these groups bonded to each other through a single bond or a linkage group, each of which groups may have one or more substituents; $R^d$ is a divalent group and is selected from a $C_1$-$C_{30}$ hydrocarbon group, a $C_4$-$C_{30}$ heterocyclic group, and a group including two or more of these groups bonded to each other through a single bond or a linkage group, each of which groups may have one or more substituents, where the linkage group is, independently in each occurrence, selected from —O—, —S—, —SO—, —$SO_2$—, —NH—, —NR'— where R' is selected from $C_1$-$C_5$ alkyl and $C_6$-$C_{10}$ aryl, —CO—, —COO—, —CONH—, and $C_1$-$C_3$ alkylene; m is selected from 1 or 2; and n is selected from 0 and 1, and wherein the oxetane compound (B) is at least one selected from the group consisting of 3-ethyl-3 [(3-ethyloxetan-3-yl)methoxy]methyl oxetane and 3-ethyl-3-hydroxymethyloxetane.

13. A curable composition comprising:
cationically curable compounds; and
a cationic-polymerization initiator,
the cationically curable compounds comprising:
(A) an epoxy compound in an amount of 10 to 90 weight percent of the total weight of the cationically curable compounds, the epoxy compound (A) comprising a compound represented by Formula (a); and
(B) an oxetane compound in an amount of 5 to 40 weight percent of the total weight of the cationically curable compounds,
the cationic-polymerization initiator comprising
(C) an onium borate salt comprising an anionic moiety represented by Formula (c-1) and a cationic moiety represented by Formula (c-2),
Formulae (a), (c-1), and (c-2) expressed as follows:

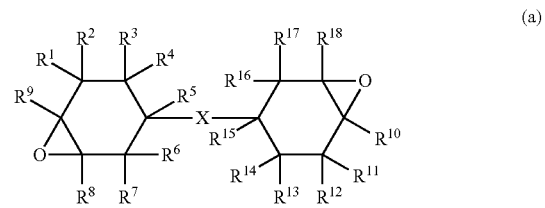 (a)

wherein $R^1$ to $R^{18}$ are each, identically or differently, selected from hydrogen, halogen, a hydrocarbon group optionally containing oxygen or halogen, and optionally substituted alkoxy; and X is a linkage group,

 (c-1)

wherein Y is, independently in each occurrence, selected from $C_6$-$C_{30}$ aryl and a $C_4$-$C_{30}$ heterocyclic group, each of which may have one or more substituents excluding halogen-containing groups; Phf represents, independently in each occurrence, a group resulting from replacing at least one of hydrogen atoms of phenyl with at least one selected from the group consisting of perfluoroalkyl, perfluoroalkoxy, and halogen; and k is an integer of 1 to 3, and

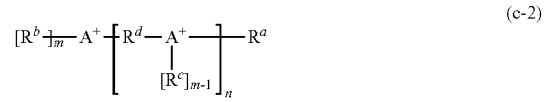 (c-2)

wherein "A" represents an m-valent atom selected from sulfur (S), iodine (I), and selenium (Se) atoms; $R^a$, $R^b$, and $R^c$ are monovalent groups and are each, identically or differently in each occurrence, selected from a $C_1$-$C_{30}$ hydrocarbon group, a $C_4$-$C_{30}$ heterocyclic group, and a group including two or more of these groups bonded to each other through a single bond or a linkage group, each of which groups may have one or more substituents; $R^d$ is a divalent group and is selected from a $C_1$-$C_{30}$ hydrocarbon group, a $C_4$-$C_{30}$ heterocyclic group, and a group including two or more of these groups bonded to each other through a single bond or a linkage group, each of which groups may have one or more substituents, where the linkage group is, independently in each occurrence, selected from —O—, —S—, —SO—, —$SO_2$—, —NH—, —NR'— where R' is selected from $C_1$-$C_5$ alkyl and $C_6$-$C_{10}$ aryl, —CO—, —COO—, —CONH—, and $C_1$-$C_3$ alkylene; m is selected from 1 or 2; and n is selected from 0 and 1.

* * * * *